W. WESTERHEIDE.
DEVICE FOR FINISHING AND PARTICULARLY FOR REMILLING VALVE SEATS AND VALVE CONES.
APPLICATION FILED APR. 24, 1913.
1,085,832. Patented Feb. 3, 1914.
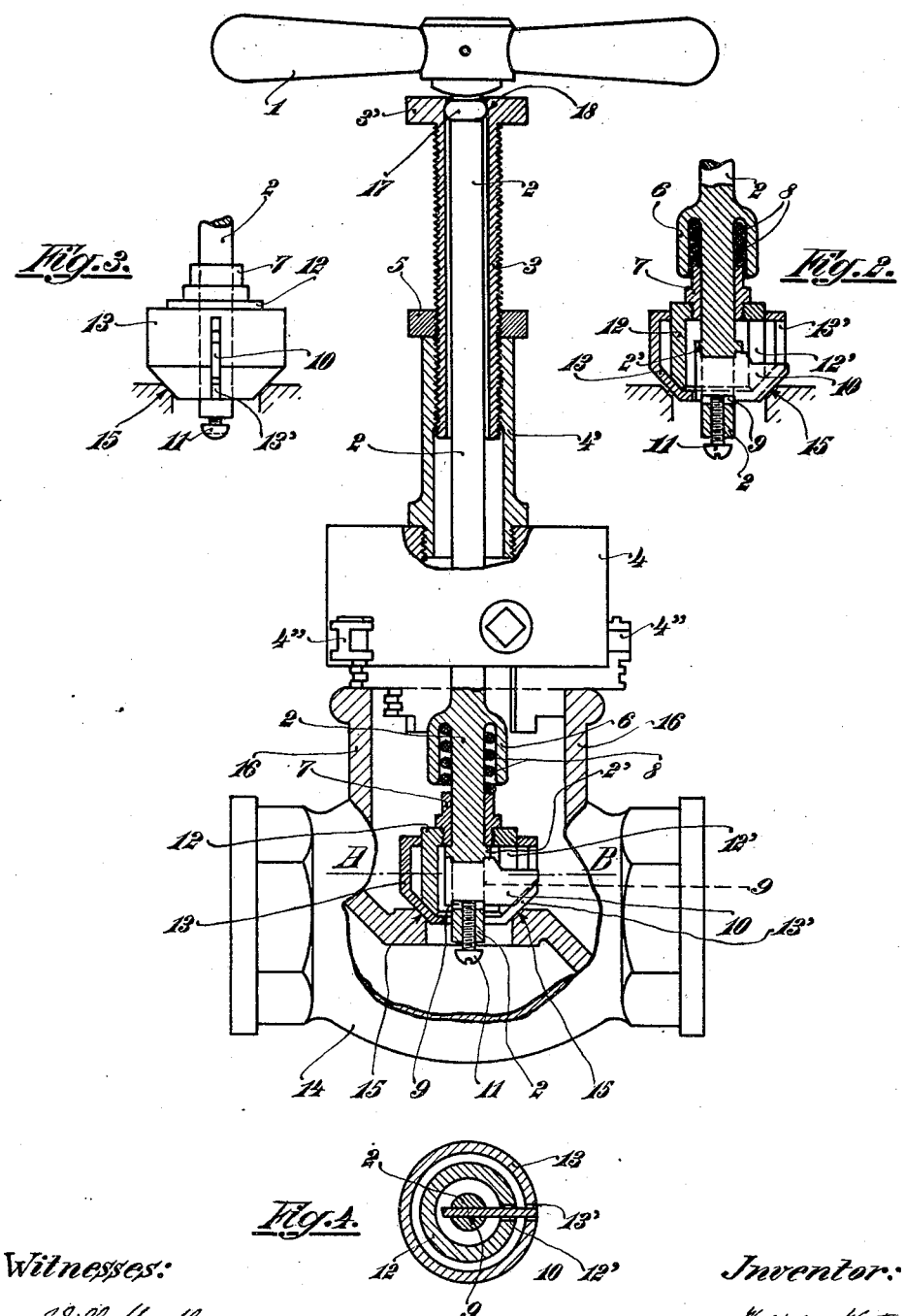

UNITED STATES PATENT OFFICE.

WILHELM WESTERHEIDE, OF DUSSELDORF, GERMANY.

DEVICE FOR FINISHING AND PARTICULARLY FOR REMILLING VALVE-SEATS AND VALVE-CONES.

1,085,832.  Specification of Letters Patent.  Patented Feb. 3, 1914.

Application filed April 24, 1913. Serial No. 763,436.

*To all whom it may concern:*

Be it known that I, WILHELM WESTERHEIDE, a subject of the King of Prussia, German Emperor, residing at Dusseldorf, in the Kingdom of Prussia, German Empire, have invented certain new and useful Improvements in Devices for Finishing and Particularly for Remilling Valve-Seats and Valve-Cones, of which the following is a specification.

This invention relates to a device for the finishing and for the remilling of valve seats, said device being constructed in such a manner that it has simply to be inserted into the valve casing and to be operated in said casing.

The device can, within certain limits, be used for valve seats of any size as the cutter and the guide-piece for the same are removable and therefore can be easily replaced. The shaft of the cutter is suspended so that it can oscillate, whereby the accurate centering of the cutter is insured.

In the accompanying drawings the invention is shown by way of example.

Figure 1 shows partly in front elevation and partly in section the re-milling device in working position inserted in a valve seat. Fig. 2 shows part of the device in working position. Fig. 3 is a side elevation of Fig. 2. Fig. 4 is a cross section on line A—B of Fig. 1.

The re-milling device consists of a rod 2 with handle 1 mounted in a tubular screw spindle 3 so that it can turn in the same. The inner diameter of the boring of the screw spindle 3 is larger than the outer diameter of the rod 2. The hollow screw spindle 3 is screwed into the sleeve 4' of a chuck of known construction, a collar 3' at the upper end of the hollow screw spindle serving for turning said spindle in said sleeve 4'. A nut 5 screwed upon the screw spindle 3 is designed to prevent the screw spindle from turning when said nut is tightly screwed against the upper edge of the sleeve 4'. The rod 2 has at its lower end, which projects from the chuck 4, a short bell-shaped flange 6 open at the lower end in which a spiral spring 8 is located which surrounds the rod 2 and bears with its lower end upon a loose sleeve 7 mounted upon a ring-shaped flange 2' of the rod 2. The lower end of the rod 2 has a cross slit 9 for the cutter 10 which is adapted to be fixed by means of a set screw 11 screwed into the lower end of the rod 2. The lower end of the loose sleeve 7 is externally threaded and carries a cylindrical casing 12 with conical lower end which has a vertical slot through which the end of the cutter projects. An outer guide casing 13 with conical lower end is mounted upon said cylindrical casing 12. The guide-casing 13 has a vertical slot 13' for the cutter. The rod 2 has at its upper end, under the handle 1, a flange 17 with rounded outer surface which engages with a narrow part 18 of the boring of the screw spindle.

The device operates as follows: To mount the cutter in the rod 2, the screw spindle 11 is removed and a guide-casing 13 of the required size corresponding to the size of the valve seat, is pushed over the inner cylindrical casing 12 so that the vertical slots 13'— 12' of the two casings register with the slit 9 of the cutter rod 2. After a cutter 10 of the required size has been inserted laterally into the slit 9 the screw 11 is tightened so that the cutter is secured in its position. The clamping nut 5 is loosened and the screw spindle 3 is lowered until the cutter 10 stands flush with the lower end of the slot 13' of the guide-casing 13 (Fig. 2) whereupon the nut 5 is tightened again to secure the screw spindle 3 in its position. The apparatus can now be inserted into the valve casing 14 whose seat 15 has to be re-milled. The apparatus is inserted into the tubular socket 16 of the valve body after the accessory parts of the valve and the valve cone (not shown in the drawings) have been removed. The cutter rod 2 is exactly adjusted or centered according to the center of the valve seat 15 by means of the gripping jaws 4'' of the chuck 4 whereupon the nut 5 is loosened and the spindle 3 is lowered until the guide-casing 13 of the cutter sits upon the valve seat 15. The spindle is turned until the cutting edge of the cutter 10 comes in contact with the valve seat whereupon the nut 5 is screwed home, whereupon the rod 2 can be turned by means of the handle 1 in the required direction and the cutter begins to work. The handle 1 is preferably turned with the right hand, the left hand manipulating the nut 5 and the spindle 3. Some turns of the cutter rod are generally sufficient to make the surface of the valve seat 15 quite smooth and finished. If the surface to be re-milled is badly damaged it will be necessary to further lower the guide-casing 13 for the cutter for which purpose the nut 5 is loosened with the left hand, the spindle 3 is lowered and the nut tightened again so that at the further turning of the cutter rod another thin shave is taken off the valve seat, this operation being repeated until the valve seat is perfectly smooth. When the spindle 3 is being lowered the spiral spring 8 is compressed so that, through the action of this spring, a soft and gradual attack of the valve seat by the cutter is insured. If the cutter finds a certain resistance it yields as, owing to the spiral spring 8, it is elastically mounted.

If the center of the hole of the valve seat 15 and the center of the chuck 4 respectively the axis of the tubular socket 16 of the valve seat do not register the cutter 10 can nevertheless be exactly centered owing to the fact that the lower end of the cutter rod 2 can be laterally swung as its upper rounded flange 17 can be turned in the narrowed part 18 of the boring of the screw spindle.

I claim:—

1. Device for re-milling valve seats comprising in combination: a cutter rod having a slit near its lower end, a handle for said cutter rod, a flange with rounded surface at the upper end of said cutter rod, a hollow screw spindle with a central boring of larger diameter than said cutter rod said boring being narrowed at the upper end for the reception of said flange of the cutter rod, means for centering the screw spindle upon the valve, a cylindrical casing having a vertical slot mounted upon the lower end of said cutter rod and a guide-casing having a vertical slot loosely mounted upon said cylindrical casing, a vertical lower end of said guide-casing corresponding with the shape of the valve seat, a cutter inserted in said slit of the cutter rod projecting through said vertical slots of said casings, and means for elastically pressing said guide casing upon said valve seat, substantially as described and shown and for the purpose set forth.

2. Device for re-milling valve seats comprising in combination: a cutter rod having a slit near its lower end, a handle for said cutter rod, a flange with rounded surface at the upper end of said cutter rod, a hollow screw spindle with a central boring of larger diameter than said cutter rod said boring being narrowed at the upper end for the reception of said flange of the cutter rod, a chuck, a tubular internally threaded socket at the upper end of said chuck designed to receive said screw spindle, a nut upon said screw spindle adapted to be pressed against the upper end of said chuck socket, a cylindrical casing having a vertical slot mounted upon the lower end of said cutter rod and a guide-casing having a vertical slot loosely mounted upon said cylindrical casing, a vertical lower end of said guide-casing corresponding with the shape of the valve seat, a cutter inserted in said slit of the cutter rod projecting through said vertical slots of said casings, and means for elastically pressing said guide-casing upon said valve seat, substantially as described and shown and for the purpose set forth.

In witness whereof I have hereunto set my hand in the presence of two subscribing witnesses.

WILHELM WESTERHEIDE. [L. S.]

Witnesses:
HELEN NUFER,
JULIUS FESTNER.